R. C. FRAMPTON.
CONTROLLING APPARATUS FOR WATER HEATERS.
APPLICATION FILED OCT. 12, 1908.
973,647.
Patented Oct. 25, 1910.
2 SHEETS—SHEET 1.
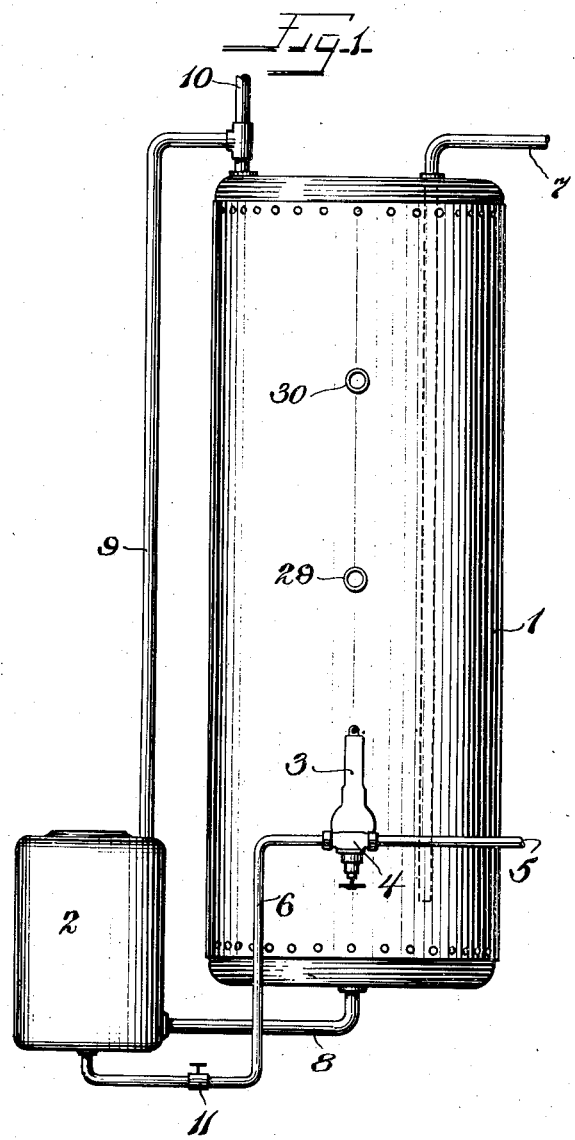
WITNESSES
INVENTOR R. C. FRAMPTON.
CONTROLLING APPARATUS FOR WATER HEATERS.
APPLICATION FILED OCT. 12, 1908.
973,647.
Patented Oct. 25, 1910.
2 SHEETS—SHEET 2.
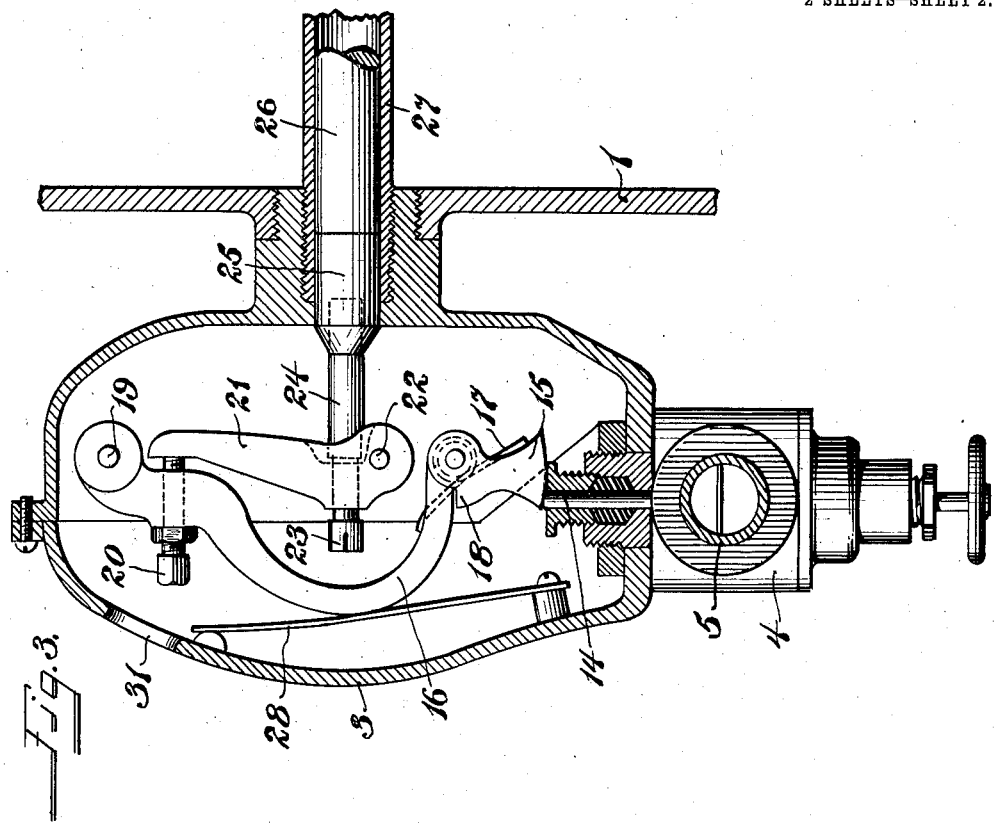
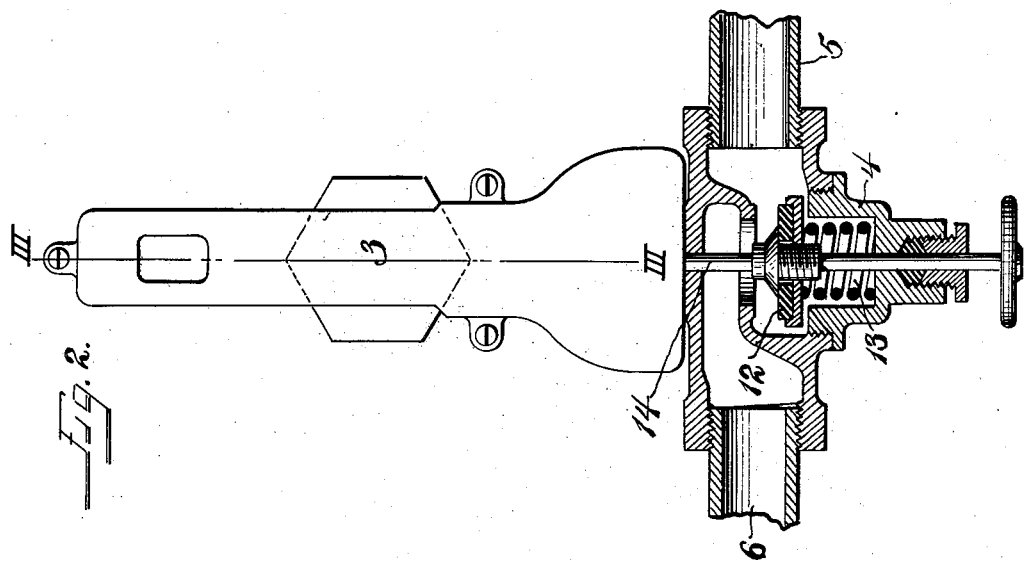
WITNESSES
INVENTOR

UNITED STATES PATENT OFFICE.

REYNOLDS C. FRAMPTON, OF SWISSVALE, PENNSYLVANIA.

CONTROLLING APPARATUS FOR WATER-HEATERS.

973,647.  Specification of Letters Patent.  Patented Oct. 25, 1910.

Application filed October 12, 1908. Serial No. 457,382.

*To all whom it may concern:*

Be it known that I, REYNOLDS C. FRAMPTON, a citizen of the United States, residing at Swissvale, in the county of Allegheny and State of Pennsylvania, have invented certain new and useful Improvements in Controlling Apparatus for Water-Heaters, of which the following is a specification.

The invention relates to means for controlling the flow of gas for water heaters and particularly to means of this character controlled by the temperature of the water. The invention has for its principal objects; the provision of an improved controlling means of the character specified which will permit the rapid heating of the water until a predetermined temperature is attained at which time the gas is entirely cut off; the provision of an improved controlling device which will obviate all danger of explosions due to over-heating the water and which requires no pilot light; and the provision of a thermostat regulating means which will increase the economy of operation of the heater. One embodiment of the invention is illustrated in the accompanying drawings, wherein:—

Figure 1 is a front elevation of the heater showing the application of the controlling means and the gas and water piping, Figure 2 is a detail front elevation of the controlling means with the casing of the gas valve broken away, and Figure 3 is a partial section and partial side elevation, the section being taken on the line III—III of Fig. 2.

Referring first to the general arrangement of parts as shown in Fig. 1, 1 is the heater tank which may be of any approved construction, 2 is the heater provided with the usual gas burners, 3 is the thermostatic controlling means wherein the invention particularly resides, 4 is the gas valve controlled by the thermostat, 5 is the inlet pipe to the gas valve, 6 is the pipe leading from the gas valve to the burners in the heater 2, 7 is the cold water inlet to the tank, 8 is a pipe for carrying the water from the bottom of the tank to the heater 2, 9 is a return water pipe from the heater to the top of the tank, 10 is the outlet from the tank, and 11 is an additional gas valve for controlling the flow through the pipe 6.

Briefly stated, the members 3 and 4 for controlling the flow of gas to the burners comprise in their preferred form a manually operated valve in the gas passage normally spring held shut, a catch for holding the valve in open position, and a thermostat extending into the heater and connected so as to trip the catch when the water reaches a predetermined temperature. In operation the valve is manually pulled open and engaged by the catch, which catch maintains it in this position until operated by the thermostat, at which time the gas is entirely shut off.

Referring now to Figs. 2 and 3 which show in detail the construction of the controlling means, it will be noted that the valve 4 is provided with a disk 12 normally held closed by means of the spring 13, and that the stem 14 of this valve is mounted for reciprocation in the casing and has its front end extended into the casing of the controlling mechanism 3, (Figure 3). This inner end of the valve stem 14 is adapted to be engaged by a catch 15, and when so engaged the valve is held open as illustrated in Figure 2. The catch 15 is pivotally mounted upon the end of a lever 16, and is normally held in the position indicated in Figure 3 by means of the spring 17. When in this position the shoulder 18 of the catch engages positively with the side of the lever in the manner illustrated. The lever 16 is pivoted at 19 in the casing and is provided with an adjusting screw 20 bearing against the end of the second lever 21. This lever 21 is pivoted in the casing at 22 and is provided with a bearing screw 23, which takes against the thermostat pin 24. The pin 24 is carried by the brass end member 25 which engages the porcelain rod 26 at its inner end. The porcelain rod 26 takes against the end of the copper tube 27 at its rear end in a manner well known in the art, such tube 27 being screw-threaded to the casing of the controlling apparatus in the manner shown in Figure 3. The spring 28 serves to force the lever 16 forward as the thermostat tube 27 expands.

In operation, the valve stem 14 is first pulled forward to the position indicated in Figure 3, the spring 17 causing the catch 15 to move forward and engage the end of such valve rod. The valve 11 (Figure 1) is now turned on the desired amount and the burners in the heater 2 lighted. The parts remain in the position indicated in Figures 2 and 3 until the water in the reservoir surrounding the tube 27 is heated to a predetermined temperature, which temperature is sufficient to expand the tube 27 so that the levers 21 and 16 move far enough to the right to carry the catch 15 past the end of the valve stem 14 thus allowing the valve disk to snap shut entirely cutting off the flow of the gas to the burners. When the water in the heater cools or is drawn off and replaced by cold water, all of the parts indicated in Figures 2 and 3 return to the position illustrated with the exception of the valve stem and the parts carried thereby and the catch 15, which catch is of course prevented from assuming the position illustrated in Figure 3 by reason of its engagement with the side of the stem which projects past the nose of the catch. The device is therefore ready for setting for another operation, and to accomplish this it is only necessary to grasp the handle on the end of the valve stem and pull it out to the position indicated in Figures 2 and 3, after which the operation above described may be repeated. It will be apparent from the foregoing that all danger of an explosion where this device is used is avoided, as it is impossible to turn on the gas without pulling out the valve disk 12, and this disk is permitted to close automatically when the water in the reservoir reaches a predetermined temperature. It will also be noted that the gas is turned on full until the disk closes automatically, there being no gradual closing of the valve as is the case where the valve stem is connected so that the thermostat moves the disk in both directions. The heating of the desired quantity of water is therefore more rapidly accomplished than in the case where thermostats are used which gradually close off the valve as the water is heated more and more, the flow of gas at the latter portion of the heating in such case being very small, and it has been found that the economy in heating is much greater where a body of water is heated rapidly than where heated slowly. It will also be seen that no pilot light is necessary, as the closure of the valve is complete, and there is no minimum flow of gas to be provided for. Another advantage incident to running the burners at full instead of at varying capacity, is due to the fact that the mixture of air and gas may be arranged so as to secure perfect combustion, and all danger of sooting the burners and of the flame flashing back and burning inside the burners is avoided. Where the flow of gas is variable, as with the gradually closing thermostat, the proportion of gas to air is constantly changing, preventing perfect combustion with a resulting sooting of the burners and uneconomical operation. If desired the additional openings 29 and 30 (Figure 1) may be provided in the heater at varying heights for the attachment of the controlling means in those cases where a less quantity of water is to be heated to the desired temperature. These openings are provided with closure plugs in the usual manner. An opening 31 (Figure 3) is provided in the casing of the controlling apparatus for access to the regulating nut 20, and where necessary the top portion of the casing may be entirely removed, such casing being made in sections as clearly illustrated in Figure 3. It will be apparent to those skilled in the art that the specific embodiment of the invention illustrated and described herein may be widely modified without departing from the broad invention involved, which merely requires that the valve and thermostat and cooperating means be so arranged that the manually operated valve is maintained in full open position after manual setting until the water in the reservoir reaches a predetermined temperature, at which time the valve is entirely closed and operative connection between the valve and thermostat discontinued so that the valve is not opened by the further operation of the thermostat.

Having thus described my invention and illustrated its use, what I claim as new and desire to secure by Letters Patent is the following:—

1. In a storage water heater, the combination with a reservoir and gas heating means therefor, of a thermostat operated by the water in the reservoir, a valve, means exerting yielding pressure at all times to close the valve, a yielding catch adapted to move automatically into operative engagement with the valve when the valve is manually moved to open position, and the temperature of the water in the heater is below a predetermined point and operative connections from the thermostat to the catch whereby the catch is tripped to permit the valve to close when the water in the reservoir reaches a predetermined temperature.

2. The combination with a thermostatic controlling means and a gas valve, of yielding means bearing continuously upon the valve to move it to closed position, a yielding catch adapted to move automatically into operative engagement with the valve when the valve is moved to open position, and restrained by the valve from such movement when the valve is closed, and a connection between the thermostatic controlling means and the catch whereby the catch is moved by the thermostatic controlling means to release the valve and permit the yielding means to move it to close position.

3. In a storage water heater, the combination with a reservoir and gas heating means therefor, of a thermostat operated by the water in the reservoir, a manually operable valve for controlling the flow of gas to the heating means, a spring for closing the valve, a movable member provided with a movable catch portion positively held against movement in one direction and normally yieldingly held against movement in the reverse direction in position to prevent the closing of the valve when it is manually opened, and operating connections from the thermostat to the movable member whereby the catch portion is tripped to permit the valve to close when the water in the reservoir reaches a predetermined temperature.

4. In a storage water heater, the combination with a reservoir and gas heating means therefor, of a thermostat operated by the water in the reservoir, a manually operable valve for controlling the flow of gas to the heating means, a spring for closing the valve, a catch for the valve normally yieldingly held so as to move forward and prevent the closing of the valve when it is manually opened, and operating connections from the thermostat to the catch whereby the catch is tripped to permit the valve to close when the water in the reservoir reaches a predetermined temperature, and operative connections between the thermostat and the valve interrupted until the valve is again manually set.

In testimony whereof I have hereunto signed my name in the presence of the two subscribing witnesses.

REYNOLDS C. FRAMPTON.

Witnesses:
DOERING BELLINGER,
ARCHWORTH MARTIN.